United States Patent
Garrett (10) Patent No.: US 11,639,036 B2
(45) Date of Patent: May 2, 2023

(54) REINFORCED THERMOPLASTIC AND FABRIC INJECTION OVERMOLDING

(71) Applicant: Toledo Molding & Die, Inc., Plymouth, MI (US)

(72) Inventor: Jonathan Michael Garrett, Wayne, MI (US)

(73) Assignee: Toledo Molding & Die, Inc., Plymouth, MI (US)

(*) Notice: Subject to any disclaimer, the term of this patent is extended or adjusted under 35 U.S.C. 154(b) by 305 days.

(21) Appl. No.: 16/931,000

(22) Filed: Jul. 16, 2020

(65) Prior Publication Data

US 2021/0016519 A1 Jan. 21, 2021

Related U.S. Application Data

(60) Provisional application No. 62/874,577, filed on Jul. 16, 2019.

(51) Int. Cl.
| | |
|---|---|
| B29C 45/14 | (2006.01) |
| B29C 70/06 | (2006.01) |
| B29C 45/77 | (2006.01) |
| B29C 45/78 | (2006.01) |
| B29C 70/48 | (2006.01) |
| B29C 70/54 | (2006.01) |
| B29K 101/12 | (2006.01) |
| B29K 105/08 | (2006.01) |
| B29L 31/30 | (2006.01) |

(52) U.S. Cl.
CPC ........ *B29C 70/06* (2013.01); *B29C 45/14065* (2013.01); *B29C 45/14631* (2013.01); *B29C 45/77* (2013.01); *B29C 45/78* (2013.01); *B29C 70/48* (2013.01); *B29C 70/541* (2013.01); *B29C 2045/14155* (2013.01); *B29C 2945/76498* (2013.01); *B29C 2945/76531* (2013.01); *B29K 2101/12* (2013.01); *B29K 2105/089* (2013.01); *B29K 2715/003* (2013.01); *B29L 2031/3041* (2013.01)

(58) Field of Classification Search
CPC ........ B29C 45/14065; B29C 45/14631; B29C 45/0005; B29C 45/77; B29C 45/78; B29C 45/28; B29C 45/7653; B29C 2045/703
See application file for complete search history.

(56) References Cited

U.S. PATENT DOCUMENTS

2002/0190427 A1* 12/2002 Kitayama ............... B29C 43/58
264/255
2013/0001817 A1 1/2013 Bessho et al.

FOREIGN PATENT DOCUMENTS

| EP | 2468481 | 6/2012 |
|---|---|---|
| EP | 3434458 | 1/2019 |
| JP | S6463111 | * 3/1989 |
| JP | H07214599 | 8/1995 |
| JP | H11147235 | 6/1999 |

(Continued)

*Primary Examiner* — Edmund H Lee
(74) *Attorney, Agent, or Firm* — McHale & Slavin, P.A.

(57) ABSTRACT

An LWRT plus fabric injection overmolding process for the direct injection molding of thermoplastic features onto the B-side of a formed, finished Light Weight Reinforced Thermoplastic panel. The panel having an A-side finish cloth, non-woven, TPO, Vinyl or similar material placed into the injection molding press and injection molding tool, and then the features are injection molded onto the panel without damaging the A-side finish.

13 Claims, 7 Drawing Sheets

(56) References Cited

FOREIGN PATENT DOCUMENTS

JP 2004160658 * 6/2004
JP 3555331 * 8/2004

* cited by examiner

REINFORCED THERMOPLASTIC AND FABRIC INJECTION OVERMOLDING

CROSS REFERENCE TO RELATED APPLICATION

In accordance with 37 C.F.R. 1.76, a claim of priority is included in an Application Data Sheet filed concurrently herewith. Accordingly, the present invention claims priority to U.S. Provisional Patent Application No. 62/874,577 filed Jul. 16, 2019, entitled "REINFORCED THERMOPLASTIC AND FABRIC INJECTION OVERMOLDING" the contents of which is incorporated herein by reference.

FEDERALLY SPONSORED RESEARCH OR DEVELOPMENT

Not applicable

FIELD OF THE INVENTION

This invention is directed to the field of vehicle panel construction using injection overmolding and, in particular, to a process for allowing the direct injection molding of thermoplastic features onto a B-side of a panel and a finish cloth, non-woven, TPO, vinyl or similar material onto an A-side of the panel.

BACKGROUND OF THE INVENTION

Original Equipment Manufacturers OEM's are always looking for new ways to add style, value, and lightweight technology to vehicle interiors. One common family of interior panels and panel inserts is known as LWRT (Light Weight Reinforced Thermoplastics), which includes parts made of Azdel/fiberglass, NFPP (Natural Fiber Polypropylene), carbon fiber reinforced thermoplastics, and also thermoplastic or crosslinked foams, to name a few. The formability of LWRT makes it highly desirable for various vehicle applications having complex geometric shapes. One challenge has been that the LWRT material is typically composed of a mat product with limited elongational properties that is then thermoformed or compression molded, so there are limitations to what geometries are achievable with LWRT panels.

Some OEM's are not comfortable with welding of injection molded features to the B-side of an LWRT panel due to the potential for unreliable welds and A-side read-through. Also, the formation of a "class A" or cloth-finished panel requires multiple steps if B-side features are to be added to the part. No use of injection mold B-side features to an LWRT panel with an A-side cloth/non-woven/fabric on the LWRT at the time of injection molding the B-side features is known.

Most injection molded interior panels are heavy, on the order of 2,000 gsm (grams per square meter). LWRT panels can be as low as 800-1,200 gsm. Up to 60% weight savings on a large interior part. Injection molded features on the B-side of an injection molded substrate have design limitations: they cannot exceed 40% of the nominal wall of the substrate, leaving them structurally weak. Injection molded panels cannot have a soft or non-woven A-side.

SUMMARY OF THE INVENTION

Disclosed is an LWRT plus fabric Injection Overmolding process that allows the direct injection molding of thermoplastic features onto the B-side of a formed, finished LWRT panel. In this process, the LWRT panel with an A-side finish cloth, non-woven, TPO, Vinyl or similar material is placed into the injection molding press and injection molding tool, and then the features are injection molded onto the LWRT without damaging the A-side finish.

An objective of the instant invention is to teach a process wherein injection molded features can be molded to the B-side of a LWRT panel.

Another objective of the instant invention is to teach a process wherein any LWRT panel can be used, including panels made of Azdel/fiberglass reinforced plastic, NFPP (Natural Fiber Polypropylene) LWRT, Thermoplastic foam panels, and carbon fiber reinforced thermoplastics, to name a few. Any injection molded resin can be used, but it is recommended to use resins with very low linear shrinkage.

Still another objective of the instant invention is to teach a reduction of manufacturing steps. This process takes a trimmed or punched LWRT panel with the A-side fabric/non-woven/cover material already applied, and injection molds features to the B-side, requiring no further steps to make a finished part. No secondary welding required.

Still another objective of the instant invention is to teach a process wherein any LWRT substrate material can be used (Azdel, NFPP, etc.), as well some thermoplastic or even crosslinked foams.

Yet still another objective of the instant invention is to teach a process wherein any engineered cloth, non-woven, or finish material can be used on the A-side of the part, with a few limitations.

Still another objective of the instant invention is to teach a process wherein features that are injection molded to the B-side of the part can be of any shape, dimension, or function. These features can also violate typical injection molding design limitations, including but not limited to the "40% nominal wall" limitations of injection molding.

Another objective of the instant invention is to teach a process wherein strength of bond between the LWRT and the injection molded features is higher than sonic welding.

Yet still another objective of the instant invention is to teach a process that provides better alignment of backside features than welding.

Other objectives and advantages of this invention will become apparent from the following description taken in conjunction with any accompanying drawings wherein are set forth, by way of illustration and example, certain embodiments of this invention. Any figures or photographs contained herein constitute a part of this specification and illustrate various objectives and features thereof.

DETAILED DESCRIPTION OF THE PREFERRED EMBODIMENT

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

An LWRT plus fabric injection overmolding process that allows the direct injection molding of thermoplastic features onto the B-side of a formed, finished LWRT panel. The LWRT panel with an A-side finish cloth, non-woven, TPO, Vinyl or similar material is placed into the injection molding press and injection molding tool, and then the features are injection molded onto the LWRT without damaging the A-side finish. The key features of the success of this LWRT plus fabric injection overmolding process are: the use of mold filling CAE analysis software (such as Autodesk Moldflow) to control and balance the pressures and temperatures of the incoming injection molding resin so it does not damage the LWRT or the A-side fabric; the use of adjustable tool standoffs for tonnage building in the injection molding tooling; the proper selection of a Class-A nonwoven or fabric that can withstand the process without being damaged; and use of an injection molding resin that has very low linear shrinkage.

The process permits injection molded features to be molded to the B-side of a LWRT panel. Any LWRT panel can be used, including panels made of Azdel/fiberglass reinforced plastic, NFPP (Natural Fiber Polypropylene) LWRT, Thermoplastic foam panels, and carbon fiber reinforced thermoplastics, to name a few. Any injection molded resin can be used. It is recommended that resins with very low linear shrinkage are used.

Reduction of manufacturing steps wherein the process of the instant invention takes a trimmed or punched LWRT panel with the A-side fabric/non-woven/cover material already applied, and injection molds features to the B-side, requiring no further steps to make a finished part. No secondary welding required. Any LWRT substrate material can be used (Azdel, NFPP, etc.), as well as some thermoplastic or even crosslinked foams. Any engineered cloth, non-woven, or finish material can be used on the A-side of the part, with a few limitations.

Features that are injection molded to the B-side of the part can be of any shape, dimension, or function. These features can also violate typical injection molding design limitations, including but not limited to the "40% nominal wall" limitations of injection molding. Strength of bond between the LWRT and the injection molded features is higher than sonic welding. The result provides better alignment of backside features than welding, with fewer steps.

Locating of LWRT plus A-side Fabric. In the injection molding process, the LWRT material with the A-side fabric applied is inserted into the injection molding tooling before the press is cycled. The locating of the LWRT+fabric is critical for locating the final product in vehicle. The locating can be done via pins on the tool through holes in the LWRT as was done here, or the LWRT could also be located by suction, clamps, or any number of tool mechanisms.

Adjustable shut height parting line inserts in the injection molding tooling. A critical feature of the process is the control and limitation of the injection molding machine's clamp pressure on the part. The process needs sufficient clamping at the injection molded features to resist flashing of the injection molded plastic, but not too much to damage the LWRT and cloth. As the injection molding press' clamping tonnage is typically applied to the parting line or shot-off surfaces of the injection molding tooling, this cannot happen in this process. Instead, multiple, adjustable mold standoffs were placed in the mold around the LWRT plus cloth inserted panel. These standoffs may be raised and lowered relative to the surrounding mold surface, so the clamp tonnage is built on these standoffs, and not on the part or typical tool shutoffs. By adjusting the height of these tooled standoffs, one controls the amount of the press' clamping force that is exerted onto the sensitive inserted LWRT plus cloth panel. This adjustment may be accomplished in many different ways, including but not limited to shims, set screws, tooled mechanical actions, and fixed sized blocks. In this actual tooled implementation, the method used was multiple shimmable inserts. Each tooled insert was held into place by set screw(s), and its height was adjustable by inserting thin shim(s) underneath it to raise its height. This in effect makes the final mold "shut height" adjustable. See FIG. 5. By making the clamping surface standoffs adjustable, the final clamped thickness, clamp forces applied to the LWRT plus fabric, and shut height was controllable and tunable for each specific application of resin and LWRT plus fabric material combination.

Tool design and injection molding pinch-off areas. To contain the injection molded features to their desired locations, or in other words avoid flashing the injection molded components, there needs to be ample seal-off at the injection molded plastic to LWRT interfaces. But one does not want to over-crush regions of the part that are not receiving injection molded features. This is accomplished by the adjustable shut-height inserts discussed above, as well as precise cavity thickness within the injection molding tool for the LWRT plus fabric insert. The open space between the cavity and core blocks of the mold at the injection molded features to LWRT locations is calculated from the thickness of the LWRT plus cloth insert. In regions where there are no injection molded features, the cavity may open to have several millimeters of clearance so to not smash the LWRT plus cloth insert unduly. See FIG. 6.

Injection pressure and temperature limitations. In order to successfully injection mold features to the B-side or back side of the LWRT plus cloth panel while also not damaging the cloth and/or appearance on the aesthetic insert requires precise plastic pressure and temperature control, as well as precise balance of both pressure and temperature within the cavity during the entire injection molding process. This is accomplished with the use of mold filling simulation software. Depending upon the nature and construction of both, the LWRT panel and the cloth A-side aesthetic material, each material combination will have its own limitations. In this particular case, a maximum pressure limit was between 2,000 psi-plastic and 5,000-psi plastic pressure at the injection molded feature to LWRT interface. Excessive pressures will result in damage and objectionable appearance defects in the cloth surface of the part.

Although not strictly required, the use of injection molded resins with lower linear or lower 'tooled' shrink rate is advantageous. The LWRT material is already cooled and rigid when inserted into the injection molded tool in this process. However, the injection molded plastic has an inherent shrinkage when it cools from its liquid state to its solid state. By selecting resins with lower linear shrinkage, it can reduce part damage and warpage. This reduction of linear shrinkage can also be achieved with various additives and enhanced processes, including but not limited to gas-assisted injection molding, chemical foaming additives, physical foaming methods, third party additives, and more.

Figure 1:
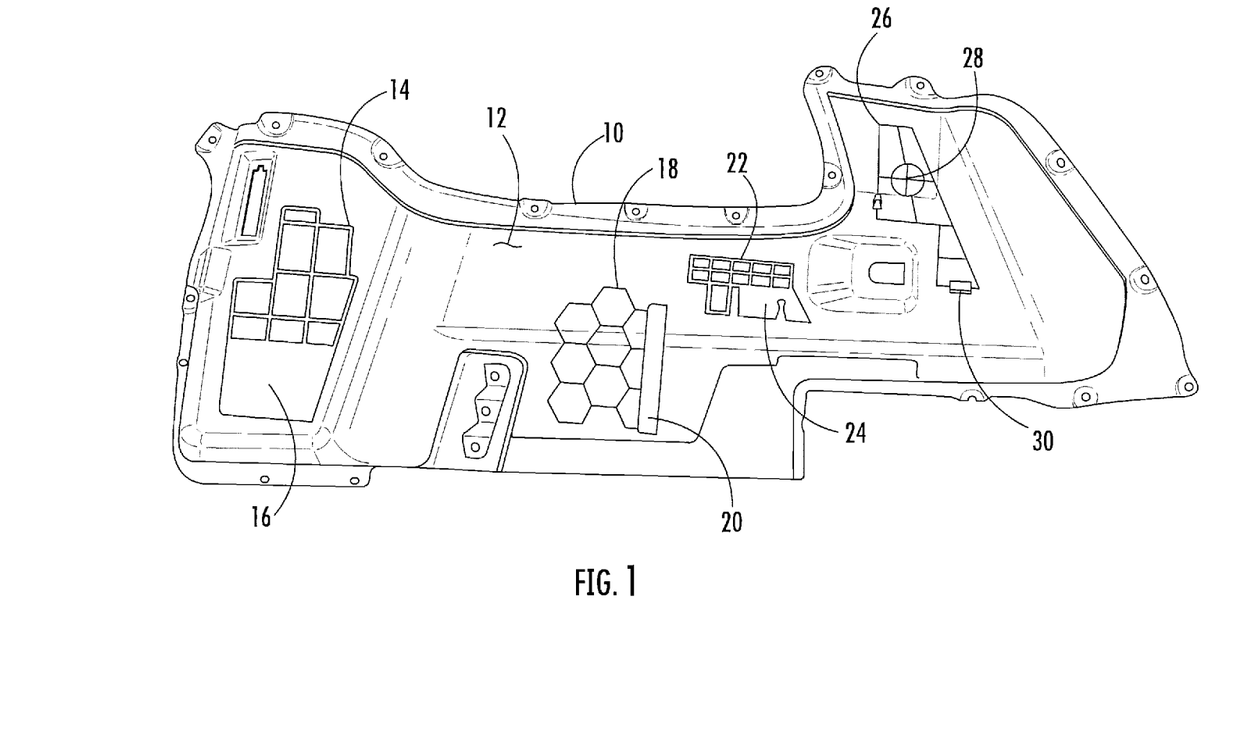
FIG. 1 is a pictorial of a LWRT panel with thermoplastic features on the B-side of the panel.
Figure 2:
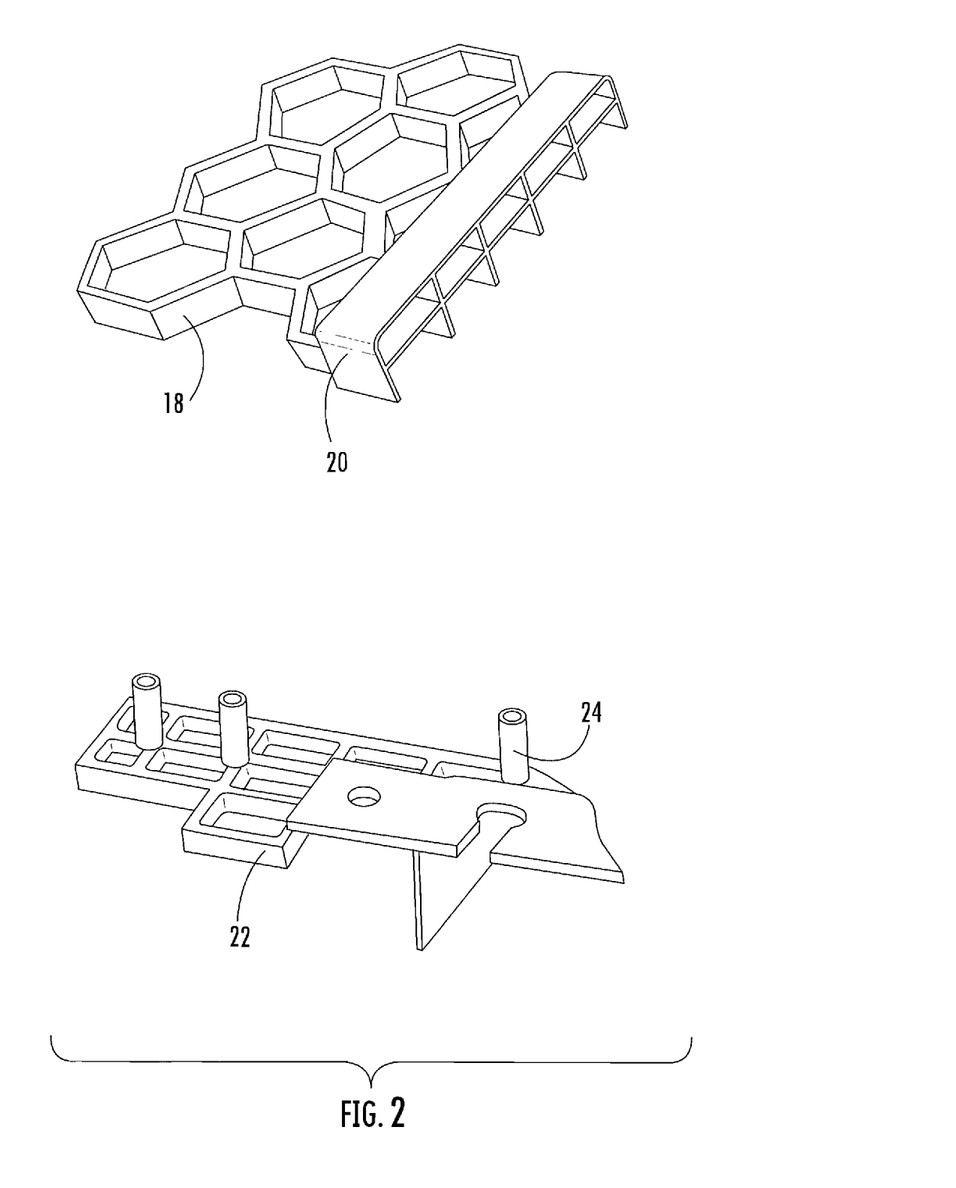
FIG. 2 is a perspective view of a honeycomb and clip reinforcing structures illustrated in FIG. 1.
Figure 3:
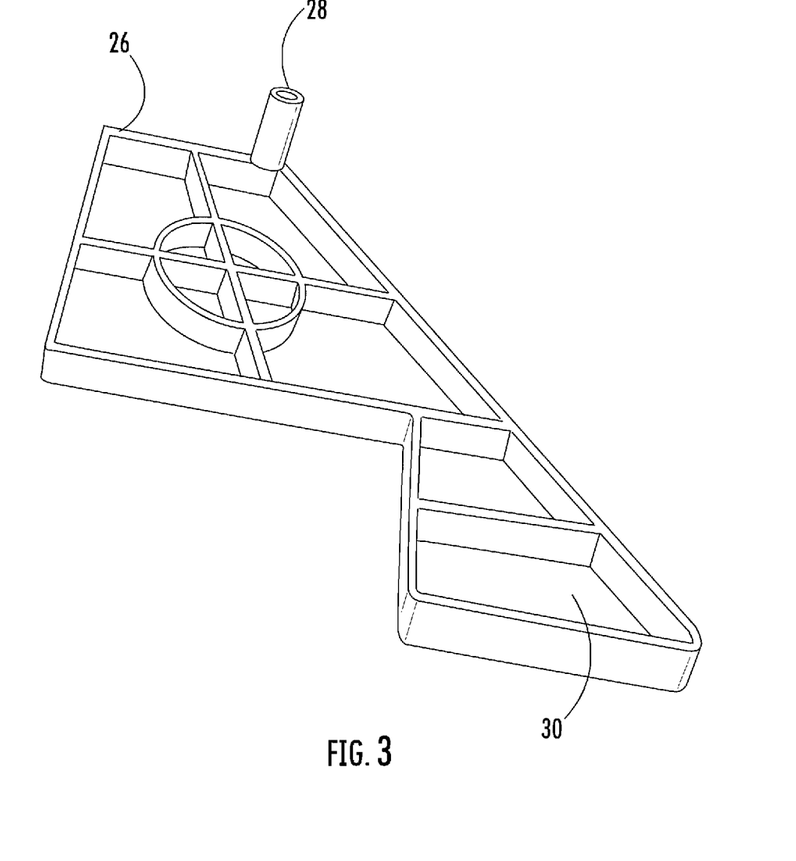
FIG. 3 is a perspective view of a clip tower with locating pin illustrated in FIG. 1.

FIG. 1 is a pictorial of a LWRT panel 10 with thermoplastic features on the B-side 12 of the panel 10. For illustration, rib structure 14 having reinforcement section 16 is depicted; honeycomb structure 18 having reinforcement section 20 is depicted; clip attachment dog house structure 22 with sonic stakes 24 is depicted; and clip tower 26 with locating pin 28 and wire harness retention 30 is depicted. It is to be understood that the thermoplastic features depicted are for illustration purposes as to the variety of features that may be added to the B-side of the LWRT panel 10. The actual feature and location thereof is dependent upon the engineering selection for a particular application. The above LWRT panel 10 illustrated is for a SUV or the like trunk cavity. FIG. 2 is a perspective view of the honeycomb structure 18 with reinforcement section 20, and the clip attachment dog house structure 22 with sonic stakes 24. FIG. 3 is a perspective view of the clip tower 28 with locating pin 28 and sire harness retention 30.

Figure 4:
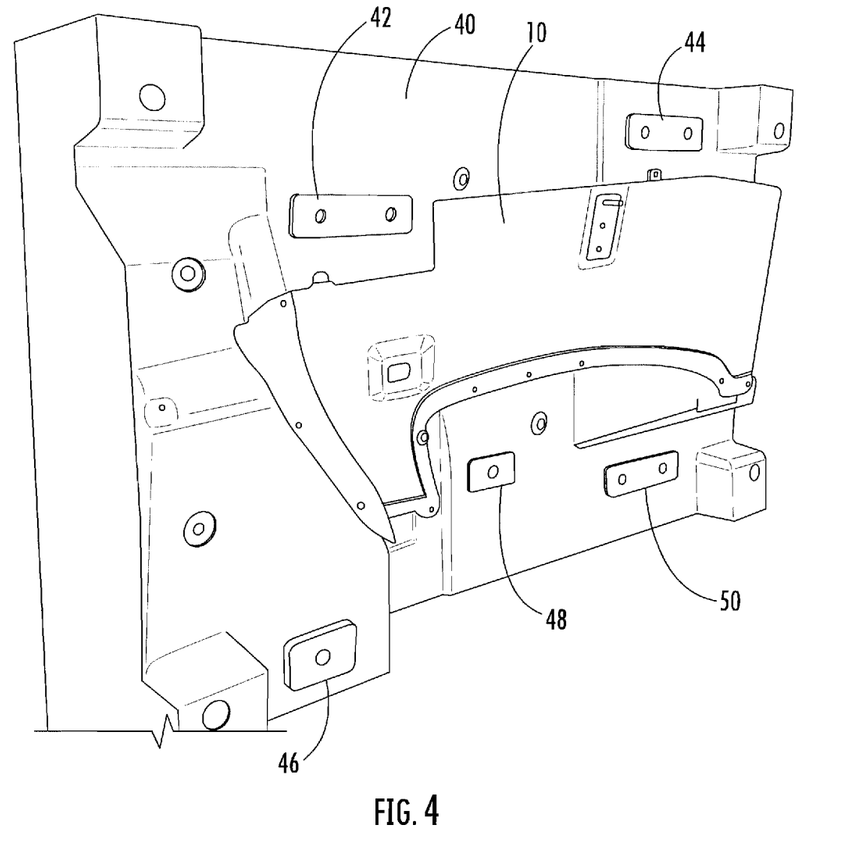
FIG. 4 is a perspective view of a mold having standoffs used in the injection molding of features onto the B-side of a LWRT panel.

FIG. 4 is a perspective view of the first half of mold 40 illustrating the LWRT panel 10 in position for receipt of the reinforcing structures. The mold 40 includes a plurality of adjustable standoff blocks that are adjustable for shut height inserts. Depicted is an upper left standoff block 42, upper right standoff block 44, lower left standoff block 46, lower center standoff block 48, and lower right standoff block 50.

Figure 5:
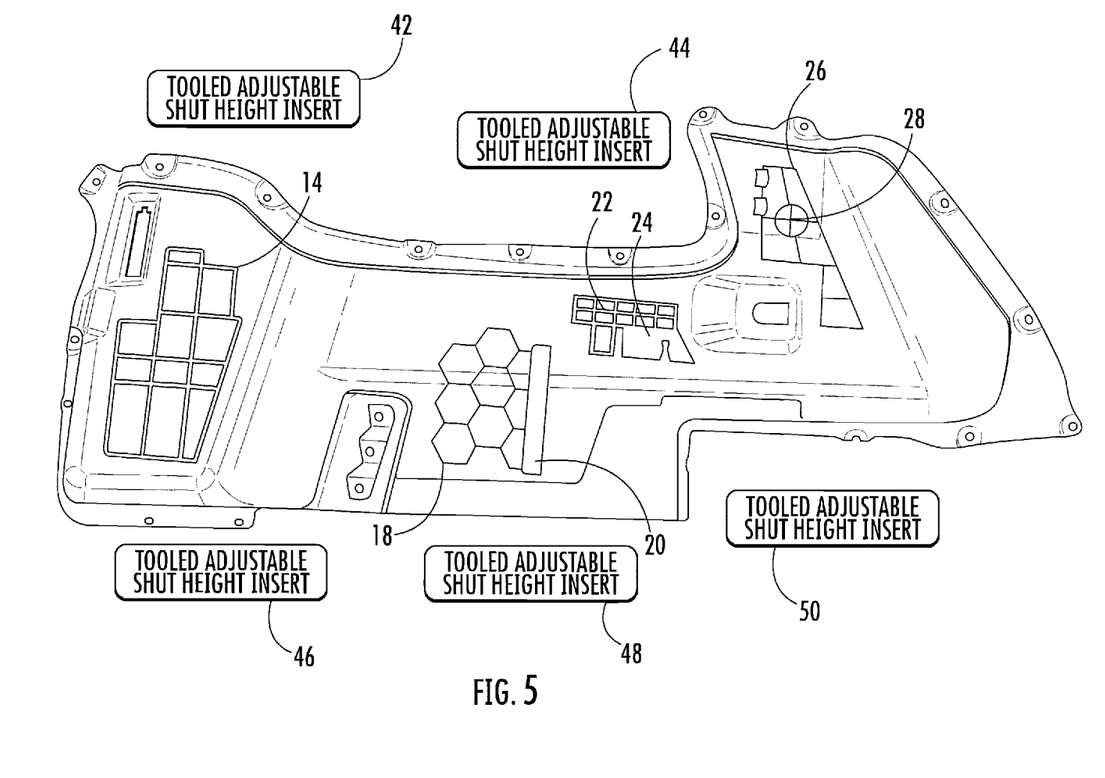
FIG. 5 is a pictorial depicting placement of tooled adjustable shut height inserts.

FIG. 5 is a pictorial frontal view depicting placement of tooled adjustable shut height insert locations, namely the upper left standoff block 42, upper right standoff block 44, lower left standoff block 46, lower center standoff block 48, and lower right standoff block 50.

Figure 6:
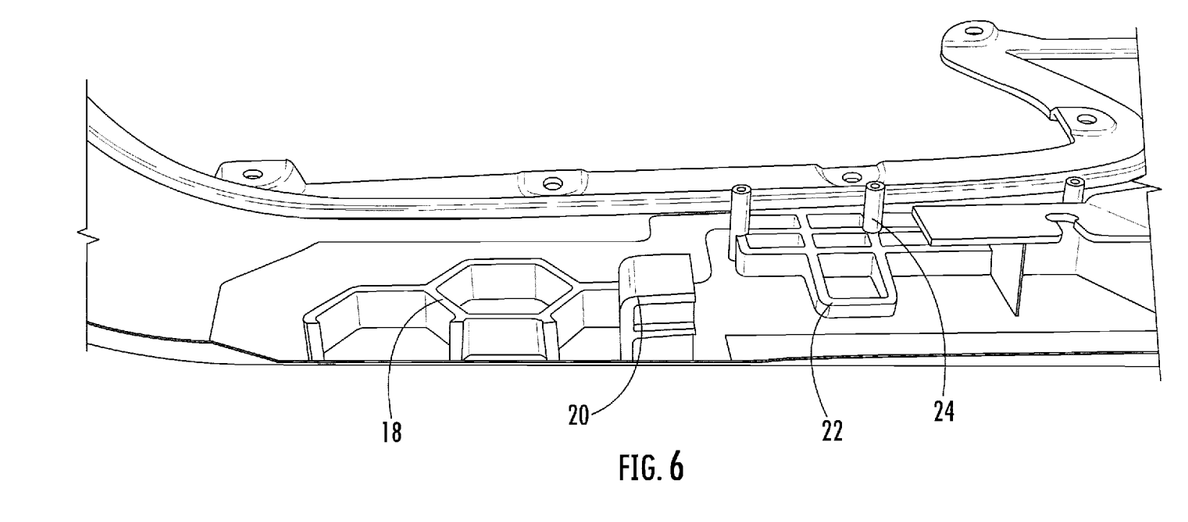
FIG. 6 is a cross sectional view illustrating reinforcement structure height.

FIG. 6 is a cross sectional view illustrating reinforcement structure height, namely the honeycomb structure 18 with reinforcement section 20, and the clip attachment dog house structure 22 with sonic stakes 24.

Figure 7:
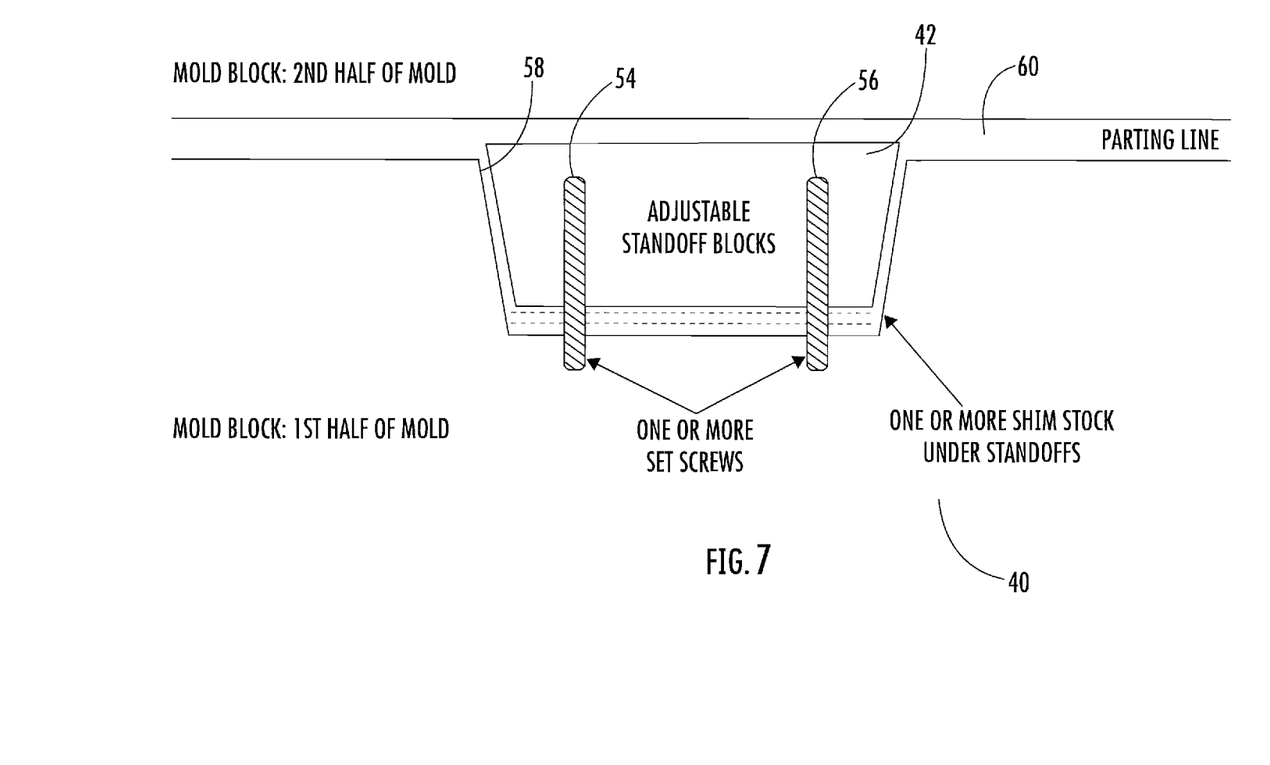
FIG. 7 is a cross-sectional view of adjustable inserts on the mold parting line.

FIG. 7 is a cross-sectional view of an adjustable standoff block 42 illustrating the placement of one or more shim stock 52 secured to the mold by use of set screws 54 and 56. The mold receptacle 58 allows the standoff block to remain flush or be extended by the shim stock to extend into the parting line formed between the first half of the mold 40 and the second half of the mold 62.

The method of injection molding thermoplastic described above comprises the steps of: inserting a Light Weight Reinforced Thermoplastic (LWRT) having an A-side with a fabric finish and a B-side into a molding tool having adjustable mold standoffs positioned in the molding tool around the LWRT with fabric inserted panel, the A-side fabric inserted into the molding tool before a press is cycled, the A-sided including a finish selected from a cloth, nonwoven, TPO, vinyl or the like material; controlling temperatures of incoming injection molding resin to the molding tool by mold filling simulation software; balancing pressures of incoming injection molding resin to the molding tool by said mold filling simulation software; adjusting tool standoffs for tonnage building in the molding tool to control clamping force exerted on the LWRT fabric, the adjustable mold standoffs are constructed and arranged to be raised and lowered relative to the surround mold surface to control the amount of clamping force exerted onto the LWRT fabric plus panel; forming injection molding features on the B-side; controlling clamping force to resist flashing of the injection molded plastic; wherein the mold filling simulation software balances, controls, and limits the injection pressures required to mold desired B-side features without damaging the LWRT plus fabric insert. In the preferred embodiment the injection molding resin has low linear shrinkage. The LWRT panel is preferably selected from the group consisting of Azdel fiberglass reinforced plastic, natural fiber polypropylene, thermoplastic foam panels, and carbon fiber reinforced thermoplastics. Locating of the LWRT fabric is preferably by use of a plurality of pins on the molding tool through holes in the LWRT. Alternatively, locating the LWRT fabric is by use of suction, clamps or like temporary fasteners.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein. One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of injection molding thermoplastic comprising the steps of:
   inserting a Light Weight Reinforced Thermoplastic (LWRT) having an A-side with a fabric finish and a B-side into a molding tool having adjustable mold standoffs positioned in the molding tool around the LWRT with fabric inserted panel, said A-sided including a finish selected from a cloth, non-woven, TPO, or vinyl material;
   controlling temperatures of incoming injection molding resin to said molding tool;
   balancing pressures of incoming injection molding resin to said molding tool;
   adjusting tool standoffs for tonnage building in said molding tool to control clamping force exerted on said LWRT fabric, said tool standoffs are constructed and arranged to control an injection molding machine's clamp pressure/force on the LWRT fabric so to resist flashing of the injection molded plastic;
   forming injection molding features on said B-side;
   wherein said LWRT plus fabric inserted part receives injection molding features on the B-side of the LWRT without damaging the LWRT or fabric finish.

2. The method of injection molding thermoplastic according to claim 1 wherein said injection molding resin has low linear shrinkage.

3. The method of injection molding thermoplastic according to claim 1 wherein said LWRT panel selected from the group consisting of fiberglass reinforced plastic, natural fiber polypropylene, thermoplastic foam panels, and carbon fiber reinforced thermoplastics.

4. The method of injection molding thermoplastic according to claim 1 wherein said LWRT material with said A-side fabric is inserted into said molding tool before a press is cycled.

5. The method of injection molding thermoplastic according to claim 1 including the step of locating the LWRT fabric by use of a plurality of pins on the molding tool through holes in the LWRT.

6. The method of injection molding thermoplastic according to claim 1 including the step of locating the LWRT fabric by use of suction, clamps or temporary fasteners.

7. The method of injection molding thermoplastic according to claim 1 wherein said step of adjusting tool standoffs is further defined as a step of raising or lowering said tool standoffs relative to the surrounding mold surface to control the amount of clamping force exerted onto said LWRT fabric plus panel.

8. The method of injection molding thermoplastic according to claim 1 wherein said steps of controlling temperatures of incoming injection molding resin to said molding tool and balancing pressures of incoming injection molding resin to said molding tool is performed by mold filling simulation software.

9. A method of injection molding thermoplastic comprising the steps of:
   inserting a Light Weight Reinforced Thermoplastic (LWRT) having an A-side with a fabric finish and a B-side into a molding tool having adjustable mold standoffs positioned in said molding tool, said A-side fabric inserted into said molding tool before a press is cycled, said A-sided including said fabric finish selected from a cloth, non-woven, TPO, or vinyl material;
   controlling temperatures of incoming injection molding resin to said molding tool by mold filling simulation software;
   balancing pressures of incoming injection molding resin to said molding tool by said mold filling simulation software;
   adjusting tool standoffs for tonnage building in said molding tool to control clamping force exerted on said LWRT fabric, said adjustable mold standoffs are constructed and arranged to be raised and lowered relative to the surround mold surface to control the amount of clamping force exerted onto said LWRT fabric plus panel;
   forming injection molding features on said B-side;
   controlling clamping force to resist flashing of said injection molded plastic;
   wherein said mold filling simulation software balances, controls, and limits the injection pressures requires to mold desired B-side features without damaging the LWRT plus fabric insert.

10. The method of injection molding thermoplastic according to claim 9 wherein said injection molding resin having low linear shrinkage.

11. The method of injection molding thermoplastic according to claim 9 wherein said LWRT panel selected from the group consisting of fiberglass reinforced plastic, natural fiber polypropylene, thermoplastic foam panels, and carbon fiber reinforced thermoplastics.

12. The method of injection molding thermoplastic according to claim 9 including the step of locating the LWRT fabric by use of a plurality of pins on the molding tool through holes in the LWRT.

13. The method of injection molding thermoplastic according to claim 9 including the step of locating the LWRT fabric by use of suction, clamps or temporary fasteners.

* * * * *